(12) United States Patent
Healey (10) Patent No.: US 12,459,201 B2
(45) Date of Patent: Nov. 4, 2025

(54) OR RELATING TO POWDER HANDLING

(71) Applicant: LPW Technology Limited, Widnes (GB)

(72) Inventor: Callum Healey, Widnes (GB)

(73) Assignee: LPW TECHNOLOGY LTD, Cheshire (GB)

( * ) Notice: Subject to any disclaimer, the term of this patent is extended or adjusted under 35 U.S.C. 154(b) by 124 days.

(21) Appl. No.: 18/554,433

(22) PCT Filed: Apr. 5, 2022

(86) PCT No.: PCT/GB2022/050845
§ 371 (c)(1),
(2) Date: Oct. 6, 2023

(87) PCT Pub. No.: WO2022/214797
PCT Pub. Date: Oct. 13, 2022

(65) Prior Publication Data
US 2024/0181705 A1 Jun. 6, 2024

(30) Foreign Application Priority Data
Apr. 6, 2021 (GB) ...................................... 2104882

(51) Int. Cl.
*B29C 64/329* (2017.01)
*B29C 64/141* (2017.01)
(Continued)

(52) U.S. Cl.
CPC .......... *B29C 64/329* (2017.08); *B29C 64/141* (2017.08); *B29C 64/259* (2017.08);
(Continued)

(58) Field of Classification Search
CPC ... B29C 64/329; B29C 64/259; B29C 64/343; B29C 64/141; B33Y 30/00; B33Y 40/00; F16K 1/221; F16K 35/06; F16K 31/60
(Continued)

(56) References Cited

U.S. PATENT DOCUMENTS 2,065,019 A * 12/1936 Pedersen ................. B01F 35/45
220/255
3,147,891 A * 9/1964 Ficlitz ..................... G01F 11/46
222/166

(Continued)

FOREIGN PATENT DOCUMENTS

CN 210456610 U 5/2020
WO 2001/075342 A1 10/2001

OTHER PUBLICATIONS

International Search Report and Written Opinion for PCT/GB2022/050845, dated Jun. 30, 2022, 11 pages.

*Primary Examiner* — Craig M Schneider
*Assistant Examiner* — Christopher M Afful
(74) *Attorney, Agent, or Firm* — Schwabe, Williamson & Wyatt, P.C.

(57) ABSTRACT

Described is a powder dispensing apparatus for dispensing a powder, comprising: a dispensing chamber for dispensing a predetermined volume of powder to a receptacle; an inlet valve movable between a closed state and an open state to control ingress of powder into the dispensing chamber from a powder source; an outlet valve movable between a closed state and an open state to control egress of powder from the dispensing chamber to a receptacle. The inlet valve and outlet valve are individually actuated between the closed state and open state by a common removable handle. The inlet valve and outlet valve each comprise an interlock for receiving and engaging the handle. The interlock is configured to receive and release the handle when the respective (Continued)

valve is in the closed state and engage the handle so as to prevent removal of the handle when the respective valve is in the open state.

20 Claims, 6 Drawing Sheets (51) Int. Cl.
*B29C 64/259* (2017.01)
*B29C 64/343* (2017.01)
*B33Y 30/00* (2015.01)
*B33Y 40/00* (2020.01)
*F16K 1/22* (2006.01)

(52) U.S. Cl.
CPC ............ *B29C 64/343* (2017.08); *B33Y 30/00* (2014.12); *B33Y 40/00* (2014.12); *F16K 1/221* (2013.01)

(58) Field of Classification Search
USPC .............................. 141/1, 346, 336; 222/191
See application file for complete search history.

(56) References Cited

U.S. PATENT DOCUMENTS

| | | | | |
|---|---|---|---|---|
| 3,496,958 | A * | 2/1970 | Herman | F16K 11/08 |
| | | | | 137/329.01 |
| 4,151,933 | A * | 5/1979 | Myers | G01F 11/024 |
| | | | | 222/548 |
| 5,295,507 | A | 3/1994 | Bandy | |
| 8,807,520 | B2 * | 8/2014 | Bunod | F16K 31/602 |
| | | | | 251/292 |
| 2011/0163118 | A1 * | 7/2011 | Gieda | G01F 11/24 |
| | | | | 222/452 |
| 2011/0233808 | A1 | 9/2011 | Davidson | |
| 2015/0034853 | A1 | 2/2015 | Gutmann | |
| 2020/0223210 | A1 | 7/2020 | Swier | |

* cited by examiner

OR RELATING TO POWDER HANDLING

CROSS-REFERENCE TO RELATED APPLICATION

The present application is a national phase entry under 35 U.S.C. § 371 of International Application No. PCT/GB2022/050845, filed Apr. 5, 2022, which designates the United States of America, which claims priority to GB Application No. 2104882.2, filed Apr. 6, 2021, the entire disclosures of each of these applications are hereby incorporated by reference in their entireties and for all purposes.

TECHNICAL FIELD OF THE INVENTION

The present invention relates to an apparatus and method for dispensing a powder. The invention is particularly useful for dispensing known quantities of powder for use in an additive layer manufacturing system.

BACKGROUND TO THE INVENTION

Additive layer manufacturing, ALM, is a generic term for a fabrication process in which physical parts are manufactured in a layerwise manner. There are many types of ALM manufacturing methods falling within different classifications based on the general processing technique used, with each classification typically including many different variants.

One such classification is powder bed processes in which layers of powder are sequentially deposited and consolidated in accordance with a desired geometry. The geometry for each layer corresponds to a section, or slice, of a 3D CAD model of the desired part. Thus, when each layer has been deposited and consolidated, the resulting stack of consolidated layers provides the desired 3D shape corresponding to the 3D CAD model. Powder bed processes typically include methods known as selective laser sintering, selective laser melting and electron beam melting.

Another classification of ALM is blown powder manufacturing. A blown powder process comprises consolidating a stream of powder as it is deposited in a desired geometry.

ALM techniques, particularly powder-based techniques such as powder bed and blown powder processes, may be used to fabricate metallic, ceramic and polymer components for a wide variety of components across a broad spectrum of different of technologies and industries.

The fabrication of components using powder based ALM methods is subject to many variables and obtaining repeatable processing is typically essential to the success of a manufacturing process or production line. To help provide consistency within a powder based ALM process, it is desirable to use powders having known and repeatable characteristics, thereby reducing the number of variables in any particular process and much effort has been expended in recent years in providing consistent and reliable powders to this end. The variables affecting a powder may include, for example, particle size and distribution, composition and purity. However, as will be appreciated, this attention to detail in the manufacture and supply of the powders naturally leads to increased cost in the powder supply chain and embedded cost for ALM parts. Furthermore, due to the requirements of the powders, it is often difficult and/or inefficient to recycle powder which is not consolidated or used in an ALM process. Hence, there is a need to monitor the amount of powder which is used in an ALM machine and the levels which are held in stock.

The present invention seeks to provide an improved method and associated apparatus for dispensing powder in a controlled, repeatable manner to help provide consistency and reduce waste of powder.

Although the above background is concerned with powder based ALM technologies, it will be appreciated that the present invention may be utilised in other areas which utilise powders.

SUMMARY OF THE INVENTION

The present invention provides a powder dispensing apparatus and method for dispensing powder according to the appended claims.

In a first aspect, the present disclosure provides a powder dispensing apparatus for dispensing a powder, comprising: a dispensing chamber for dispensing a predetermined volume of powder to a receptacle; an inlet valve movable between a closed state and an open state to control ingress of powder into the dispensing chamber from a powder source; an outlet valve movable between a closed state and an open state to control egress of powder from the dispensing chamber to a receptacle, wherein the inlet valve and outlet valve are individually actuated between the closed state and open state by a common removable handle; wherein the inlet valve and outlet valve each comprise an interlock for receiving and engaging the handle, wherein the interlock is configured to receive and release the handle when the respective valve is in the closed state and engage the handle so as to prevent removal of the handle when the respective valve is in the open state.

Providing a powder dispensing apparatus in which the inlet valve and outlet valve of the dispensing chamber are operated by a common, i.e. the same, handle prevents both valves being open at the same time. Hence, the flow of powder directly from the powder source into the receptacle can be prevented and the quantities readily and reliably measured when being dispensed. Further, the accidental spillage of powder may be prevented or limited when the receptacle is not attached to the dispensing chamber or is removed from the dispensing chamber.

The dispensing chamber may comprise either or both of the inlet valve and outlet valve. Alternatively, the inlet valve may be provided on the powder source or may be an intermediate member which is attached between the dispensing chamber and powder source. Similarly, the outlet valve may form part of the receptacle or may be a separate part which is mounted between the dispensing chamber and receptacle.

Providing the inlet and outlet valves as part of the dispensing chamber provides a convenient way to arrange the apparatus. Further, the handle which is used to operate the valves can be associated with the dispensing chamber and used to dispense powder from multiple different powder sources.

The powder source may comprise a hopper having a hopper outlet which is in powder flow communication with the inlet valve. The hopper may be portable. Prior to the attachment of the dispensing chamber, the hopper may be a sealed unit such that the powder housed within the hopper is isolated from contaminants or impurities. The hopper outlet may comprise an outlet valve.

The dispensing chamber may be detachably attached to the hopper. The detachable attachment may be achieved via the inlet valve. Providing a detachable attachment for the dispensing chamber allows the hopper to be provided separately and the dispensing chamber to be used with different hoppers.

The inlet valve and outlet valve may comprise a rotatable spindle to which the handle is mounted. The rotation of the spindle may actuate the valve between the closed state and open state. The handle may be inserted into the spindle. The insertion of the handle into the spindle may be along an insertion axis.

The powder dispensing apparatus may further comprise a spindle housing in which the spindle is located. The spindle housing may be fixed in relation to a valve housing.

The interlock may comprise the spindle housing. The spindle housing may be configured to receive the handle when the valve is in the closed state and retain the handle to prevent withdrawal when the valve is in the open state.

The spindle housing may comprise an interlock aperture which extends circumferentially around a spindle and defines the actuation travel path of the handle.

The interlock aperture may include an insertion aperture and an elongate actuation aperture having a longitudinal axis defining a circumferential length and a width which is transverse to the longitudinal axis.

The insertion aperture may be wider than the transverse width of the actuation aperture. Thus, the interlock aperture may narrow from the insertion aperture to the actuation aperture. The interlock aperture may be keyhole shaped.

The spindle housing may comprise first and second interlock apertures. The interlock apertures may be similarly shaped and have similar sizes. The first and second interlock apertures may be located on diametrically opposed sides of the spindle housing. The first interlock aperture may be on the handle side of the spindle housing. The second interlock aperture may be on the side which corresponds to the terminal end of the handle. The first and second interlock apertures may receive different portions of the handle.

The interlock aperture which engages with the terminal end of the handle may be smaller than the interlock aperture which is located on the handle side of the spindle housing. Providing a smaller interlock aperture may restrict the direction in which the handle can be inserted into the spindle and may further prevent the handle being inserted too far into or through the spindle.

The powder dispensing apparatus may further comprise the handle. The handle may be the only handle provided with the dispensing chamber. Thus, the powder dispensing apparatus may comprise a single handle only.

The handle may comprise a mounting portion at a first end thereof. The mounting portion may be mounted to the valve in use and engage with the valve to provide the interlock.

The mounting portion may comprise an expanded section for inserting into valve spindle. The expanded section may drivable engage with the spindle. The expanded section may be seated within the spindle in use and may abut the spindle causing it to rotate with a rotation of the handle.

The mounting portion may comprise a reduced section adjacent to the expanded section with a radially extending shoulder therebetween. The shoulder may provide a stop feature which may bear against the spindle housing with the valve is in the open position and upon an attempted withdrawal of the handle.

The powder dispensing apparatus may further comprise a first and a second mounting portion distributed along a length of the handle.

When there is a first and second mounting portion, the previously recited expanded section may be a first expanded section and the reduced section may be a first reduced section of the first mounting portion.

The second mounting portion may comprise a second expanded section and a second reduced section separated by a second radially extending shoulder.

The first and second shoulders may be axially separated by a distance which is similar to the diameter of the spindle housing. Thus, in use, the first shoulder may be positioned to engage with an internal surface on a first side of the spindle housing when the valve is in an open state, and the second shoulder may be configured to engage with an external surface of the spindle housing on a diametrically opposed second side of the spindle housing.

The second mounting portion may be located at or towards the terminal end of the handle relative to the first mounting portion which may be located towards the handle portion/second end of the handle. The second expanded section may be smaller in diameter than the first expanded section. Providing a smaller expanded section at the terminal end of the handle can be used to limit an amount the handle is inserted into the spindle. That is, the insertion aperture of a second interlock aperture which receives the second expanded section may be sized to prevent the first mounting portion passing therethrough, thereby limiting the extent the handle can be inserted and making the use of the handle more convenient.

The handle may comprise a first end and a second end. The first end may be configured to engage with the interlock and the second end may be configured such that it cannot be mounted to the valve. Thus, the handle may be mounted to the valve by the first end thereof only.

The powder dispensing apparatus may further comprise the receptacle. The receptacle may be detachably attached to the dispensing chamber. The receptacle may be sealable prior to being detached from the dispensing chamber. The receptacle may comprise a valve or other closure to seal the internal volume and prevent escape of the powder.

According to a second aspect, the present disclosure provides a kit of parts comprising: the powder dispensing apparatus of the first aspect and further comprising: one or more receptacles. When a plurality of receptacles are provided, each receptacle may have a different volumetric size. The kit of parts may also comprise one or more dispensing chamber. When a plurality of dispensing chambers are provided, each dispensing chamber may have a different volumetric size.

According to a third aspect, the present disclosure provides a method of dispensing a powder from a powder dispensing apparatus comprising: a powder source; a dispensing chamber attached to the powder source; an inlet valve movable between a closed state and an open state to control ingress of powder into the dispensing chamber from the powder source; an outlet valve movable between a closed state and an open state to control egress of powder from the dispensing chamber to a receptacle; and, the receptacle, the method comprising the steps of: a) mounting a handle to the inlet valve, opening the inlet valve with the handle to allow ingress of powder into the dispensing chamber, closing the inlet valve with the handle and removing the handle; b) mounting the handle to the outlet valve and opening the outlet valve to allow egress of powder from the dispensing chamber into the receptacle; and, c) removing the receptacle.

The method may further comprise: closing the outlet valve and removing the handle from the outlet valve.

The method may further comprise: transporting the receptacle to a point of use wherein, optionally, the point of use comprises additive layer manufacture equipment.

The method may further comprise: repeating steps a) and b) prior to step c).

The method may further comprise: providing the powder source at the dispensing location.

The skilled person will appreciate that, except where mutually exclusive, a feature described in relation to any one of the aspects, embodiments or examples described herein may be employed separately or in combination with any other aspect, embodiment or example. Further, where a feature is described using the term 'may comprise', 'may include' or similar, it will be appreciated that the feature is envisaged as being optional within the context it is provided in.

BRIEF DESCRIPTION OF THE DRAWINGS

In order that the invention may be more clearly understood one or more embodiments thereof will now be described, by way of example only, with reference to the accompanying drawings, of which.

DETAILED DESCRIPTION OF THE INVENTION

Figure 1:
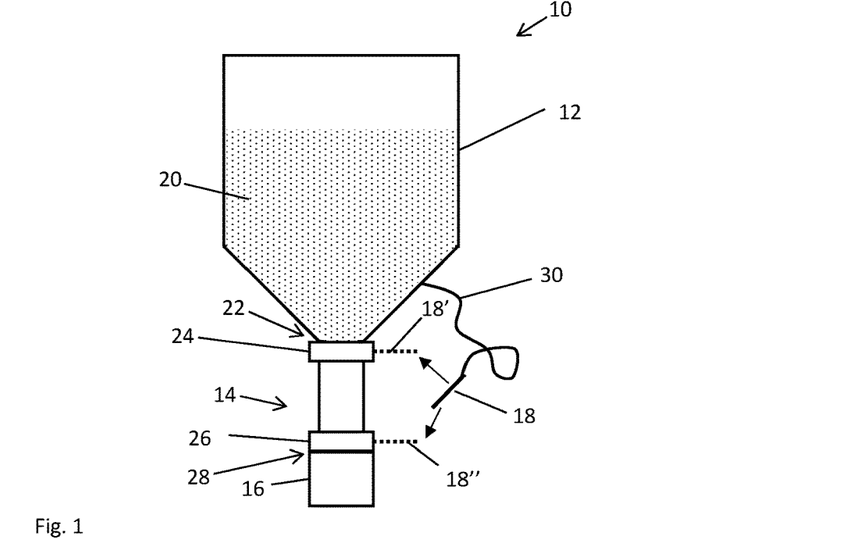
FIG. 1 shows a schematic representation of a powder dispensing apparatus.

FIG. 1 shows a powder dispensing apparatus 10. The powder dispensing apparatus 10 may include a powder source in the form of a hopper 12; a dispensing chamber 14; a receptacle 16 and a handle 18.

The hopper 12 holds powder 20 which is to be dispensed, via the dispensing chamber 14, to the receptacle 16. Typically, the hopper 12 is used to store a bulk quantity of powder 20 which is dispensed in smaller quantities for use and occasionally replenished, as required. The hopper 12 may be refilled with powder 20 in situ or replaced with a full hopper from a manufacturer or wholesaler. Hence, as will be described in connection with FIG. 6a, the hopper 12 may be filled at a different location and provided to an end user as a sealed unit containing a required bulk amount of powder having the necessary characteristics for a given process or use. The powder may be any powder, such as metal, ceramic or polymer, as may be required.

The hopper 12 may comprise any suitable receptacle in which the powder 20 can be housed. In the example shown in FIG. 1, the hopper 12 is provided by a container having an internal storage volume defined by one or more walls. The lateral cross-section (i.e. left to right as shown in FIG. 1) of the hopper 12 is not shown but may be any suitable profile, such as circular or square etc. The hopper 12 is provided with an outlet 22 at a lowermost point of the internal storage volume such that powder can be dispensed via gravity.

The outlet 22 includes a suitable connection for sealably mating with the dispensing chamber 14 and may comprise a valve for sealing the hopper and allowing it to be transported.

The dispensing chamber 14 may be detachably attachable to the hopper 12 such that it is removable and interchangeable with different dispensing chambers 14 of varying sizes. In some embodiments, the dispensing chamber 14 may be permanently fixed to the hopper 12 such that the hopper 12 and dispensing chamber 14 are supplied or used as a single unit without the intention of swapping the dispensing chamber 14 with other dispensing chambers 14. The connection between the hopper outlet 22 and dispensing chamber 14 may be achieved using conventional means, such as a bolted or welded flanged arrangement or some form of coupling or interlock, for example.

The connection between the hopper 12 and the dispensing chamber 14 provides a flow path through which the powder 20 may flow so as to be provided to the receptacle 16. The flow path may be gated such that it is not possible for there to be a continuous flow path from the hopper 12 to the receptacle 16. The gating of the flow path may be provided by an inlet valve 24 and an outlet valve 26, which are arranged such that the inlet valve 24 may not be open at the same time as the outlet valve 26, and vice versa.

The dispensing chamber 14 defines a known internal volume which is used to dispense known measures of powder 20 from the hopper 12 to the receptacle 16. The dispensing chamber 14 comprises an inlet which is attached to the hopper outlet 22 so as to receive powder 20 therefrom, and an outlet which is attached to the receptable 16 so as to deliver powder which is within the dispensing chamber 14.

The dispensing chamber 14 may be provided by any suitable receptacle in which a known volume of powder 20 can be received from the hopper 12. In some embodiments, the dispensing chamber 14 will comprise a hollow vessel having a first inlet end, and a second outlet end located at opposing ends of the internal volume. The dispensing chamber 14 shown in FIG. 1 includes an outer wall which extends between the first end and second end and defines the internal volume therein. The dispensing chamber may be generally elongate and may have any desirable lateral section, such as circular. The dispensing chamber may be provided by a pipe of circular cross section, for example.

The receptacle 16 is provided to receive the measured volume of powder 20 from the dispensing chamber 14. The receptacle 16 may be used as a portable container which can be used to transport the powder 20 from the hopper 12 to a point of use, such as an ALM machine. However, in some embodiments, the hopper 12 may be located at a point of use, such as an ALM machine in which case, the receptacle may be part of the ALM machine, for example, or a powder processing system.

The dispensing chamber inlet valve 24 may form part of the hopper 12, the dispensing chamber 14, or be an intermediary component which couples the hopper 12 and the dispensing chamber 14. The dispensing chamber outlet valve 26 may form part of the dispensing chamber 14, the receptacle 16 or be an intermediary component which couples the dispensing chamber 14 to the receptacle 16.

As noted above, the flow path between the hopper 12 and receptacle is gated such that there it is not possible to obtain a continuous flow path between the hopper outlet 22 and the receptacle inlet 28. As such, the inlet valve 24 and outlet valve 26 may be exclusively operable such that only one of the inlet valve 24 and outlet valve 26 can be open at any one time.

The inlet valve 24 and outlet valve 26 are each operable to have an open state, in which powder can flow therethrough, and a closed state, in which powder cannot flow therethrough. The actuation of the valves 24, 26 between the open state and closed state is provided by a common handle 18, that is, the same handle 18.

The handle 18 may be operably attached, by insertion for example, to the inlet 24 and outlet 26 valves via an interlock. In one embodiment, the interlock may be configured such that the handle 18 is operably engaged and disengaged whilst the respective valve 24, 26 is in a closed state, but not disengageable whilst the respective valve is an open state. Thus, the handle 18 cannot be withdrawn following an opening of the valve until the valve has been fully closed. Providing a single common handle for the powder dispensing apparatus 10 therefore limits the operation of the valves to a single valve at a time allowing the gating of the dispensing chamber 14 to be realised.

In some embodiments, the handle 18 may be attached to the powder dispensing apparatus 10. This helps to prevent the handle 18 being mislaid, but also means that, where there are multiple powder dispensing apparatuses 10 each with their own handle within a common premises, the separate handles cannot be used in tandem to open both the inlet valve 24 and outlet valve 26 at once, thereby defeating the gated valve system. This allows multiple handles within a premises to have a common design.

The handle 18 can be attached to the powder dispensing apparatus 10 in any suitable manner. In the embodiment shown in FIG. 1, the handle 18 is tethered to the apparatus 10 by a line 30. The line 30 has sufficient length to allow the handle 18 to be inserted into the inlet valve 24 and outlet valve 26 as indicated by the dashed lines 18' and 18". The line can be attached at any suitable location.

Figure 2:
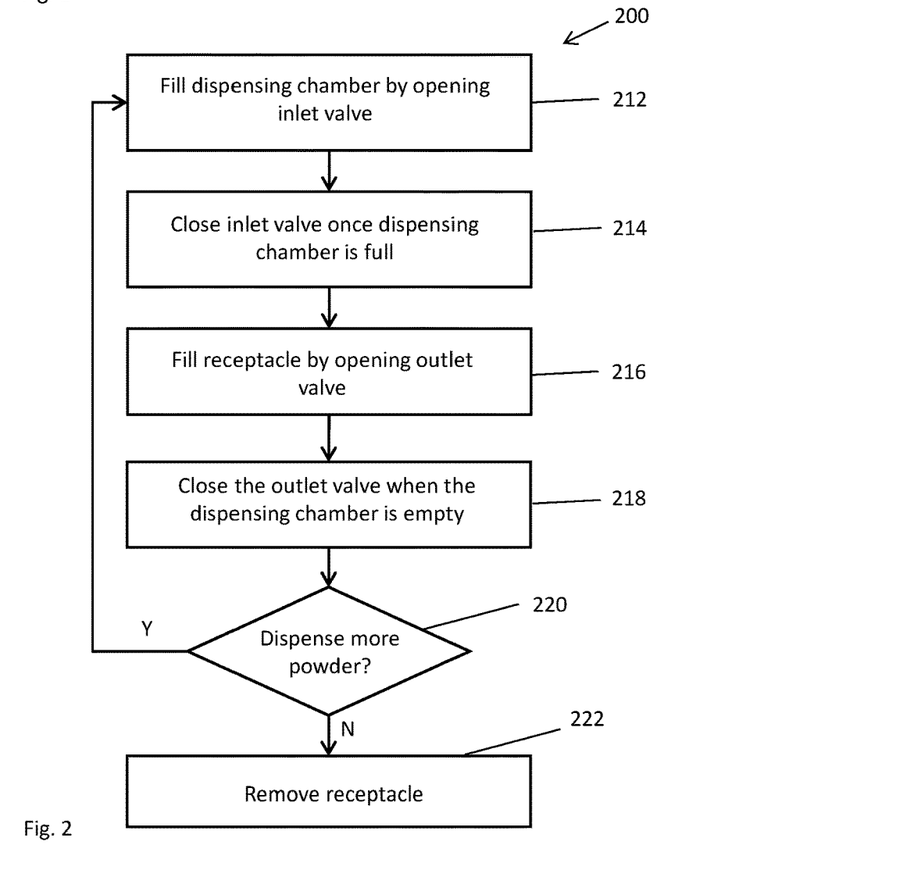
FIG. 2 shows a flow diagram representing the steps of a powder dispensing method.

A method 210 of operating a powder dispensing apparatus 10 will now be described in with reference to FIGS. 1 and 2. The first step 212 in the method is a dispensing chamber filling step which comprises opening the inlet valve 24 such that powder 20 can flow from the hopper 12 into the dispensing chamber 14 until the dispensing chamber 14 is filled to capacity. At this time, there will be a continuous column of powder extending from the dispensing chamber outlet valve 26 into the hopper 12.

At step 214, the inlet valve 24 is closed so as to isolate the powder 20 within the dispensing chamber 14 from the stock of powder 20 provided in the hopper 12. The third step is a receptacle filling step 216 which comprises opening the outlet valve 26 such that the volume of powder within the dispensing chamber 14 can flow under gravity into the receptacle 16. Once the dispensing chamber 14 has emptied, the outlet valve 26 can be closed and a determination made as to whether a further volume of powder 20 is required 220. Where further powder 20 is required within the same receptacle 16, the dispensing process, steps 212 to 218, may repeated to provide one or more further measurements of powder 20 within the receptacle 16, or the powder within the receptacle can be used or removed from the powder dispensing apparatus 10 by removing 222 the receptacle and transporting it to a point of use.

As noted above in connection with FIG. 1, the opening and closing of the inlet valve 24 and outlet valve 26 may be carried out sequentially and using a common handle 18 to help prevent both valves being open at the same time to allow only a prescribed volume of powder to be dispensed into the receptacle 16. Thus, step 212 may include inserting and opening the inlet valve 24 with the handle 18, step 214 may include closing the outlet valve 26 and removing the handle 18, step 216 may include inserting and opening the outlet valve 26 with the handle 18, and step 218 may include closing the outlet valve 26 and withdrawing the handle 18.

A handle 318 and operation of a valve 324 will now be described with reference to FIGS. 3a to 3c. The valve 324 shown in each of the FIGS. 3a to 3c may correspond to either the inlet valve 24 or outlet valve 26, which may be similar to one another in the dispensing apparatus 10 according to some embodiments. Valve 324 is shown as being a separate component in FIGS. 3a to 3c and may be inserted between the different constituent parts of the dispensing apparatus 10 as required. However, as described above, the valve 324 may be directly attached to or be part of the hopper 12, dispensing chamber 14, or receptacle 16.

In some respects, the valve 324 is conventional in that it comprises a valve housing 332 having a valve inlet 334 and a valve outlet 336 with a flow passage extending therebetween. The flow passage includes a valve member (not shown) which is operable to move between a closed position corresponding to a closed state for the valve 324, and an open position corresponding to a closed state for the valve 324 upon rotation of a valve spindle 336. The valve may be, for example, a butterfly valve. The rotation of the spindle 338 is actuated using the handle 318. In the embodiment of FIGS. 3a to 3c, the handle 318 engages with the spindle 338 to provide a radially extending lever which can be cranked about the rotational axis 340 of the spindle 336 to rotate the spindle 336 and open or close the valve 324. Thus, the handle 318 provides a hand lever for a valve spindle 338.

The handle 318 engages with the spindle 338 via an interlock 342. The interlock 342 is configured such that the handle 318 can operably engage and disengage with the spindle 338 when the valve 324 is in the closed state. Once the handle 318 has been rotated about the spindle axis 340 away from the closed state, the handle 318 cannot be withdrawn until the valve 324 is returned to the closed state.

Figure 3A:
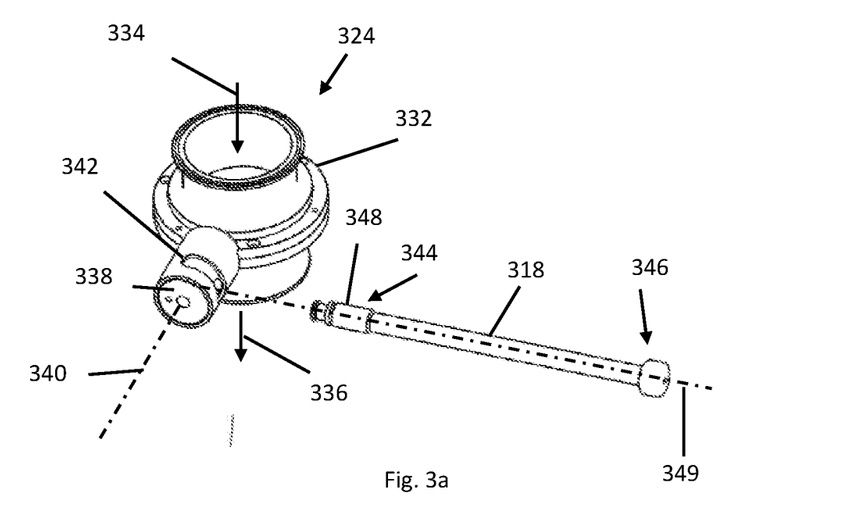
FIGS. 3a to 3c show the operating sequence for a valve which may be used in the powder dispensing apparatus shown in FIG. 1.
Figure 3B:
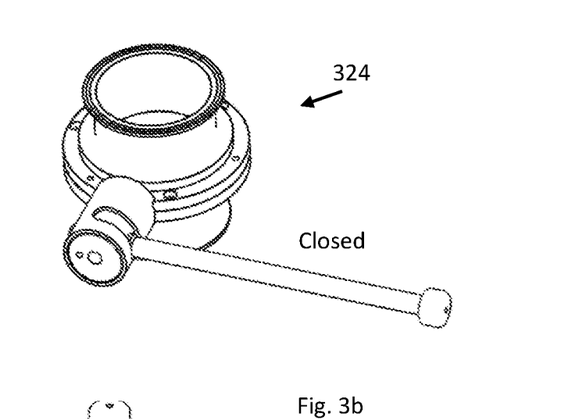
Figure 3C:
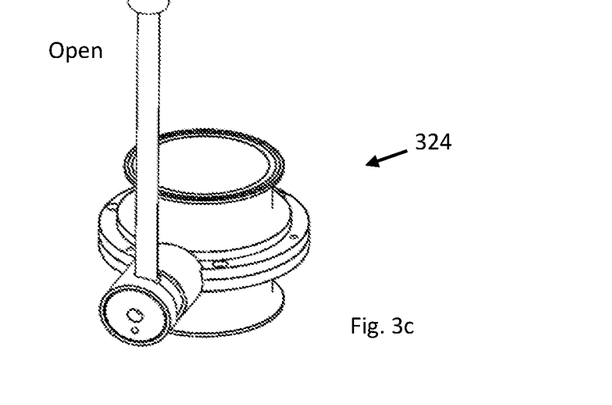

FIG. 3a shows the handle 318 prior to insertion into the valve 324. FIG. 3b shows the handle fully inserted into the spindle 338 with the valve 324 in the closed state. FIG. 3c shows the valve 324 in the open state and the handle 318 interlocked with the spindle 338 such that it cannot be withdrawn. In FIG. 3c, the valve 324 is shown as being fully open with the spindle 338 having been rotated through 90 degrees from the closed position. However, it will be appreciated that the valve 324 begins to open with the initial movement of the handle 318 about the axis 340. In other words, the handle 318 can only be removed when there is no flow path for a powder through the valve 324.

The handle 318 is shown as an elongate member, e.g. a rod, having a first end 344 and a second end 346 with a handle shaft extending therebetween. The first end 344 comprises a mounting portion 348 for inserting into and engaging with the interlock 342 along insertion axis 349. The second end 346 is distal to the spindle 338 and configured to provide a portion which is graspable by hand to actuate the valve 324 in use. The second end 346 and/or shaft may be configured to aid an improved grip and/or to prevent it being inserted into the spindle 338 or otherwise being operably mounted to the valve 324. Thus, the handle 318 may be configured to operably engage with the spindle 338 via the insertion end only. In the embodiment of FIG. 3a, the handle is provided with an end having a width which is too great to be inserted into the interlock 342, e.g. an expanded end having a larger diameter that the mounting portion 348. However, the second end 346 may be configured in other ways to prevent the insertion into the interlock 342. In some embodiments, the handle 318 may comprise a mounting portion on both the first 344 and second ends 346 such that it can be used regardless of the end which is mounted to the valve 324.

Figure 4:
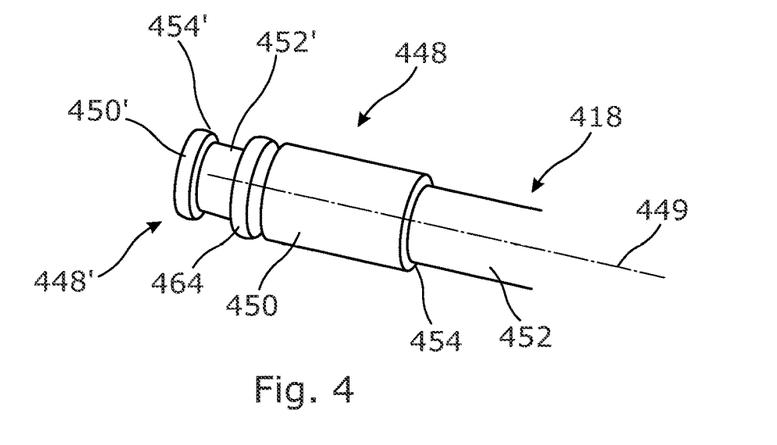
FIG. 4 shows a mounting portion of a handle which may be used with the powder dispensing apparatus shown in FIG. 1.
Figure 5A:
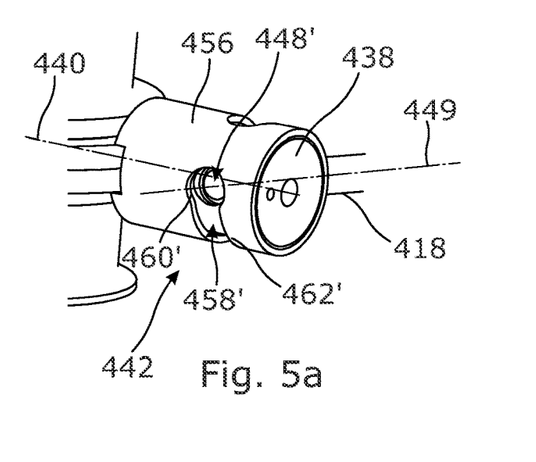
FIGS. 5a to 5c show a detailed view of a valve interlock which may be used with the handle shown in FIG. 4.
Figure 5B:
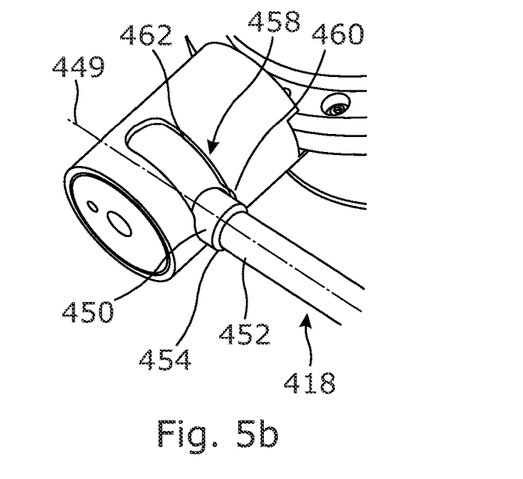
Figure 5C:
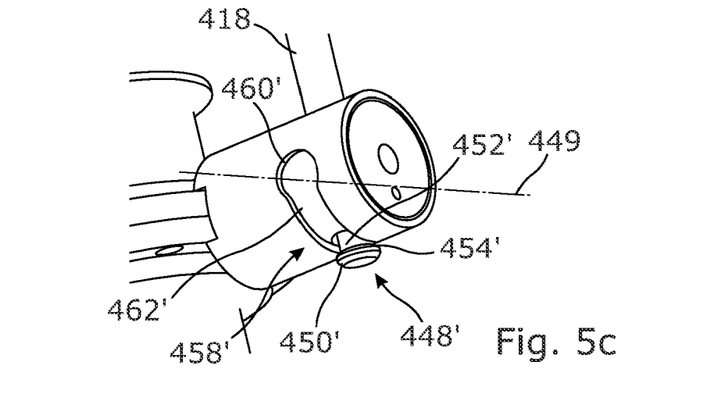

FIG. 4 shows an enlarged view of a mounting portion 448 which may be used to engage and interlock with spindle shown 338. FIGS. 5a to 5c show the engagement of a handle with the spindle 538.

The mounting portion 448 is provided at the end of a handle shaft, at the first, terminal end 344 of the handle 418, and includes an expanded section 450 which serves to engage with and drive the spindle 538 in use. The expanded section 450 comprises a length extending along the insertion axis (which may correspond to the longitudinal axis of the handle) and has a diameter which is larger than an adjacent smaller diameter section, referred to herein as a reduced section 452. The reduced section 452 is located on the handle side of the expanded section 450. Thus, the expanded section 450 has a first diameter and the reduced section 452 has a second diameter which is less than the first diameter of the expanded section 450. The embodiment of FIG. 4 includes a handle in the form of a cylindrical rod, and an expanded portion which is also cylindrical. However, it will be appreciated that different cross-sections of handle, reduced section 452 and expanded section 450 may be possible. In such cases, the diameter of the expanded section may be a width or other radial measurement. Hence, the expanded sections and reduced sections described herein may be referred to as radially expanded or radially reduced sections, wherein radial is in reference to the insertion axis 449 of the handle.

The transition between the first diameter and second diameter is provided by a lip or step, referred to herein as a shoulder 454. The shoulder 454 may be provided in the form of a radially extending surface which may be normal to the insertion axis 449 of the handle and face axially towards the second end of the handle 418. The insertion axis 449 is the line along which the handle 418 is inserted into the spindle. The diameter of the reduced section 452 may correspond to the diameter of and/or be provided by the handle shaft.

The axial length of the expanded portion 450 may be the same as or less than the width of the spindle 538 such that, once inserted into the spindle 438, it does not project beyond the spindle 538. As such, the expanded portion 450 may be housed entirely within the spindle 438 and rotatable within the spindle housing 456. The diameter of the expanded section 450 may correspond to the diameter of a through-hole in the spindle 438 such that expanded section 450 can be snugly yet freely received and abut an inside surface of the through-hole so as to rotate the spindle 438 when cranked.

The shoulder 454 provides a stop which can prevent the handle 418 being withdrawn from the spindle 538. That is, when the spindle 438 is moved from the closed state towards the open state, the shoulder 454 prevents the withdrawal of the handle 418 by bearing against corresponding wall of the spindle housing 456, which is described in more detail below.

The mounting portion 448 may be a first mounting portion. The handle 418 may comprise a second mounting portion 448'. The first and second mounting portions 448 and 448' are provided along the length of the handle 418. The first mounting portion 448 may be provided on the handle end side of the second mounting portion 448', which may be located towards or provide the terminal end of the handle 418. The first 448 and second 448' mounting portions may engage with separate interlocking portions of the spindle, as is described below in connection with FIGS. 5a to 5c. Hence, the second mounting portion 448' may engage with an opposing side of a spindle housing 456 and provide a further means for interlocking the handle 418 with the spindle 438.

The second mounting portion 448' may be constructed in a similar way to the first mounting portion 448 and may comprise a second expanded section 450' which is enlarged with respect to an adjacent, second reduced section 452'. The second reduced section 452' may be a second reduced diameter portion extended from the first expanded section 450 prior to expanding out to the second expanded section 450' via a second shoulder 454'. The second expanded section 450' may be the same size or smaller than the first expanded section 450. The second reduced portion 452' may be the same size, smaller or larger than the first reduced portion 452. In some embodiments, the first 452 and second 452' reduced portions may be substantially the same such that the handle 418 can be inserted into the spindle 418 from either direction.

It will be appreciated that the handle 418 may comprise only one of the first or second mounting portions in some embodiments.

FIGS. 5a to 5c show a spindle 438 and interlock 442 in further detail. FIG. 5a shows the rear side of the interlock 442 (with respect insertion direction of the handle 418 which is right to left along insertion axis 449) in which the handle 418 is partly located into the interlock 442; FIG. 5b shows the front side of the interlock 442 with the handle 418 partly inserted into the interlock 442, and FIG. 5c shows the handle 418 fully inserted into the interlock 442 and in the fully open position in which the handle 418 has been rotated about to the rotational axis of the spindle to lie at 90 degrees to the insertion axis 449.

The spindle 438 is a cylindrical member located within a spindle housing 456 which is fixed in relation to the valve housing 332. The spindle 438 is configured to rotate about a spindle axis 440 (which may correspond to a longitudinal axis of the spindle 438 and may be orthogonal to the insertion axis 449) when actuated by the handle 418. The spindle 438 comprises a through-hole which extends diametrically through the spindle 438 transverse to the spindle axis 440 and defines the insertion axis 449. The spindle through-hole may comprise a uniform diameter which is sized to snugly receive the first expanded section 450 of the handle 418 such that the handle can drive the spindle 438 through the required rotation. Hence, the outer surface of the first expanded section 450 may comprise a bearing surface for driving the spindle 438.

The spindle housing 456 may provide the interlock 452. In the embodiment shown in FIGS. 5a to 5c, the interlock 452 is provided by an elongate interlock aperture 458 which extends circumferentially around the spindle 438 and defines the rotational path travelled by the handle 418 when actuated. The interlock aperture 458 includes an insertion aperture 460 which corresponds to the first expanded section 450 and an actuation aperture (which may be referred to as an actuation slot) 462 which corresponds to the first reduced section 452. In the described embodiment of FIGS. 5a to 5c, the interlock aperture may generally be considered to be a keyhole shape when viewed in a radially inward direction.

As noted, the insertion aperture 460 has a shape and dimensions which correspond to the mounting portion 448 of the handle 418 such that the mounting portion 448 can be readily inserted along the insertion axis 449. The insertion aperture 460 may be the same size or larger than the spindle through-hole with the two being aligned when the valve is in the closed state.

The actuation slot 462 is an elongate extension to the insertion aperture 460 having a length which extends circumferentially around the spindle axis 440, and a transverse width which extends parallel to the spindle axis 440. The width of the actuation slot 462 is smaller than the insertion aperture 460 in the corresponding direction and is smaller than the diameter of the first expanded section 452 such that the mounting portion 448 cannot be withdrawn through the actuation slot 462 when the handle is rotated about the spindle axis 440 to lie in the actuation slot 462. More specifically, upon an attempt to withdraw the mounting portion 448 through the actuation slot 462, the first shoulder 454 would foul on the inner surface of the spindle housing 456 defined actuation slot 462.

The spindle housing 456 may comprise first 458 and second 458' interlock apertures which are diametrically opposed on either side of the spindle housing 456 and arranged to engage with the first 448 and second 448' mounting portions respectively. The first 458 and second 458' interlock apertures may comprise corresponding shapes and dimensions and may extend in a common actuation direction, which is shown as being anti-clockwise in FIGS. 5a to 5c. Thus, the insertion apertures 460, 460' are aligned along the insertion axis 449 on either side of the spindle 438 and the respective actuation apertures 462, 462' extend in an anti-clockwise direction away from the respective insertion aperture 460, 460' and define the direction of actuation to move the valve from the closed state to the open state in use.

FIGS. 5a and 5b show the handle 418 being inserted into the spindle 438 when the valve is in the closed position. Thus, in FIG. 5a, the terminal end of the handle 418 comprising mounting portions 448' and the second expanded section 450' is shown prior to emerging from the spindle through-hole and passing through the second interlock aperture 442 insertion aperture 460'. FIG. 5b shows the handle side of the mounting portion 448 which comprises the first shoulder 454 and first expanded section 450 extending into the spindle through-hole via the first insertion aperture 460. When full inserted, it will be appreciated that the first shoulder 454 sits radially within the spindle housing 456 and the second expanded section 450' sits radially outside of the spindle housing 456, as shown in FIG. 5c. Thus, each of the first 452 and second 452' reduced sections are positioned within the respective actuation aperture such that the handle 418 can be rotated to operate the valve.

As noted above, the width of the first 452 and second 452 reduced section is smaller than the respective transverse width of the actuation aperture 462, 462'. As such, the spindle 438 is rotatable such that the reduced sections pass along the length of the actuation apertures 462, 462' without fouling. Once located within the actuation aperture, the withdrawal of the handle is not possible due to the respective first and second shoulders.

FIG. 5c shows the handle in an actuated position in which the valve is fully open and the handle is interlocked to prevent it from being withdrawn.

Referring back to FIG. 4, the mounting portion may also include a third shoulder 464 which defines the transition between the first expanded section 450 and the second reduced section 452'. The third shoulder 464 may be used to prevent the handle 418 being inserted beyond the spindle by engaging with the inner surface of the second insertion aperture 460' on the opposing side of the handle 418. It will be appreciated that for this to occur, the diameter of the first expanded section 450 must be greater than the diameter of the second insertion aperture 560' and thus greater than the diameter of the second expanded portion 450'.

Figure 6A:
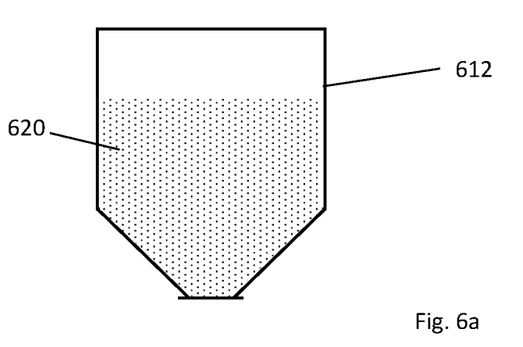
FIGS. 6a to 6j show the operational steps of a method of dispensing powder using a powder dispensing apparatus.
Figure 6B:
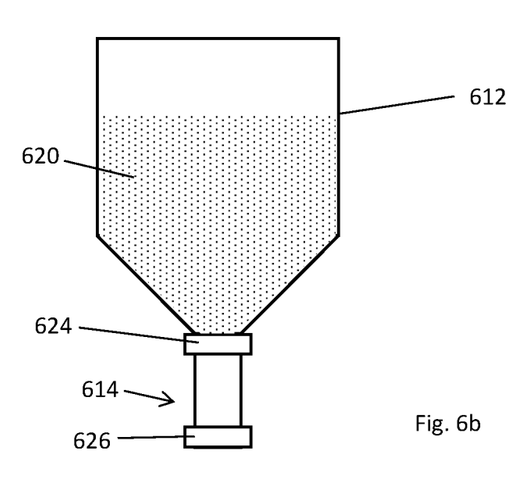

FIGS. 6a to 6j show a method in which a powder dispensing apparatus as described herein is deployed and used. In FIG. 6a there is shown a powder source in the form of a hopper 612 which includes a bulk quantity of powder 620 which is to be dispensed at a predetermined location. The location may be a central distribution location in an ALM facility, for example. The powder 620 may be prepared and loaded at a separate location/premises which specialises in the preparation and/or supply of powder. The powder 620 may, for example, be certified or otherwise guaranteed to be of particular type or quality as required by a given end user and delivered to site in a sealed hopper 612 ready for dispensing in predetermined, measured quantities.

Figure 6C:
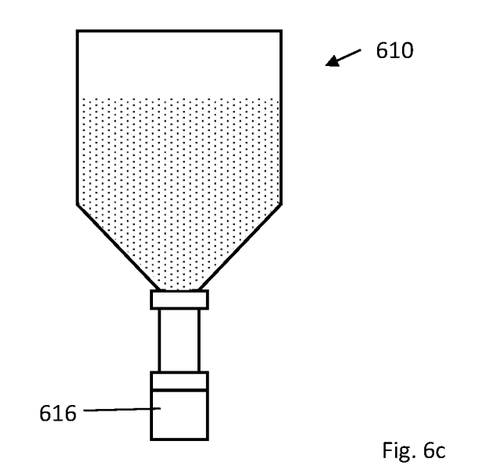

Once powder source is located in situ, a dispensing chamber 614 may be attached to the powder source 612. In the example shown in FIG. 6b, the dispensing chamber 614 includes an inlet valve 624 and an outlet valve 626 similar to those described herein. However, it will be appreciated that the inlet valve 624 may be attached to the powder source 612 and the outlet valve 626 may be attached to the receptacle 616, which, as shown in FIG. 6c, is attached to the bottom of the dispensing chamber 614. At this point, the powder dispensing apparatus 610 can be considered to be assembled for use.

Figure 6D:
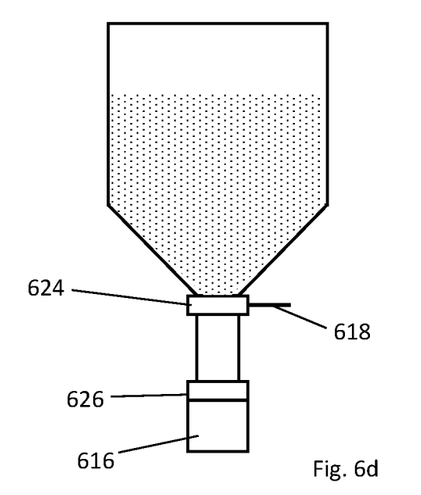
Figure 6E:
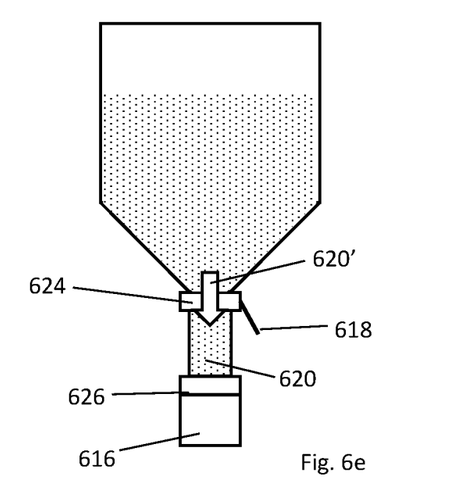
Figure 6F:
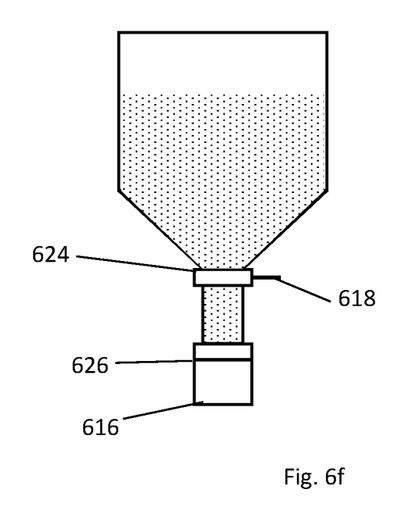

To use the dispensing apparatus, a handle 618, similar to the one described herein, may be inserted into the inlet valve 624, as shown in FIG. 6d. Once inserted, the handle 618 may be rotated to actuate the inlet valve 624 such that powder 620 can flow 620' from the powder source 612 into the dispensing chamber 614. As will be appreciated, the handle 618 may be of the interlocking type described herein which cannot be withdrawn unless the valve 624 is in the closed state. Once the dispensing chamber 620 is full and the powder flow 620' has stopped, the valve 624 can be closed as shown in FIG. 6f and the handle removed. The determination as to when the dispensing chamber is full may be achieved by waiting a predetermined number of seconds following the full actuation of the handle, for example.

Figure 6G:
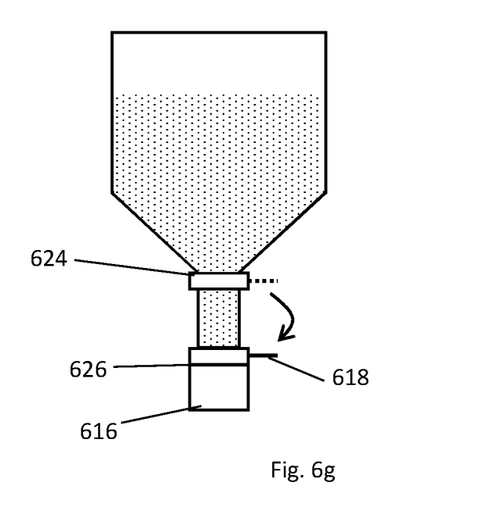
Figure 6H:
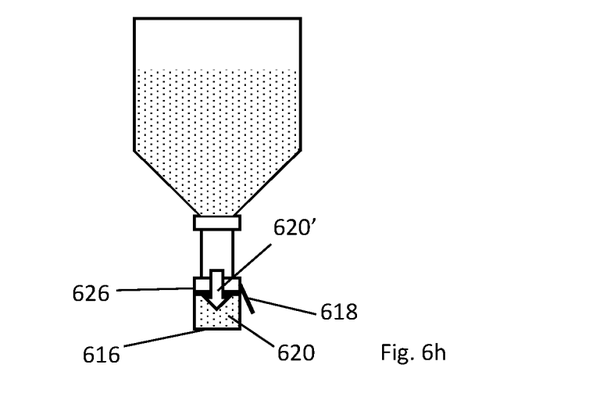
Figure 6I:
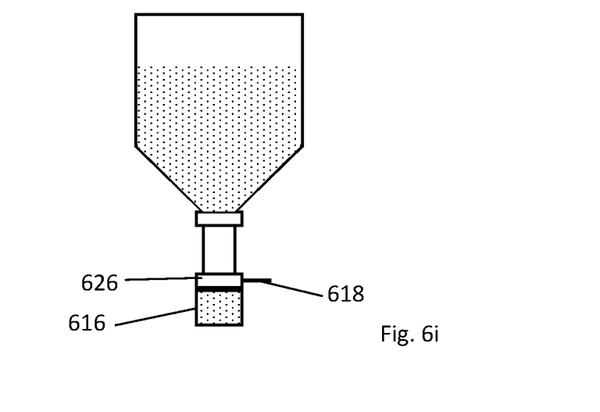
Figure 6J:
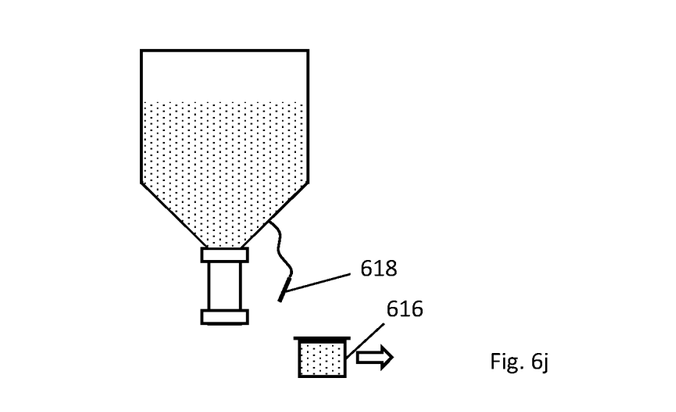

Once removed from the inlet valve 624, the handle 618 can be inserted into the outlet valve 626 as shown in FIG. 6g and actuated to fill the receptacle 616 with the quantity of powder 620 residing in the dispensing chamber 616, as shown in FIG. 6h. As noted in connection with FIG. 2, where the receptacle 616 can receive multiple loads from the dispensing chamber 614, the process shown in FIGS. 6d to 6i may be repeated. Once the desired number of powder loads has been dispensed into the receptacle 616, the outlet valve 626 is closed and the receptacle 616 sealed and transported to the location where it is to be used, as shown in FIG. 6j.

As will be appreciated, the dispensing process may be repeated multiple times and until the powder source 612 is depleted and requires replenishment. As will also be appreciated, the dispensing chamber 612 and receptables 616 may be of different sizes so as to hold varying quantities of powder, as required by an end user.

The dispensing apparatus and method described herein provide a convenient and reliable way of dispensing known quantities of powder. This allows the monitoring and tracking of powder usage to be more readily undertaken. This helps prevent wastage of powder, and allows stock levels and re-ordering of powder to be more efficient. Further, the use of exclusively operated handles prevents a continuous flow path between the bulk container and outlet/receptacle so that any loss of powder is limited to the amount contained in a dispensing chamber.

It will be understood that the invention is not limited to the examples and embodiments described herein and various modifications and improvements can be made within the scope of the claims.

The invention claimed is:

1. A powder dispensing apparatus for dispensing a powder, comprising:
    a dispensing chamber for dispensing a predetermined volume of powder to a receptacle;
    an inlet valve movable between a closed state and an open state to control ingress of powder into the dispensing chamber from a powder source;
    an outlet valve movable between a closed state and an open state to control egress of powder from the dispensing chamber to a receptacle,
    wherein the inlet valve and outlet valve are individually actuated between the closed state and open state by a common removable handle;
    wherein the inlet valve and outlet valve each comprise an interlock for receiving and engaging the handle,
    wherein the interlock is configured to receive and release the handle when the respective valve is in the closed state and engage the handle so as to prevent removal of the handle when the respective valve is in the open state.

2. The powder dispensing apparatus of claim 1, wherein the dispensing chamber comprises either or both of the inlet valve and outlet valve.

3. The powder dispensing apparatus of claim 1, wherein the powder source comprises a hopper having a hopper outlet which is in powder flow communication with the inlet valve, wherein, optionally, the hopper outlet comprises a hopper outlet valve.

4. The powder dispensing apparatus of claim 3, wherein the dispensing chamber is detachably attached to the hopper.

5. The powder dispensing apparatus of claim 1, wherein the inlet valve and outlet valve comprise a rotatable spindle into which the handle is received, wherein rotation of the spindle actuates the valve between the closed state and open state.

6. The powder dispensing apparatus of claim 5, further comprising a spindle housing in which the spindle is located, wherein the spindle housing is configured to receive the handle when the valve is in the closed state and retain the handle to prevent withdrawal when the valve is in the open state so as to provide the interlock.

7. The powder dispensing apparatus of claim 6, wherein the spindle housing comprises an interlock aperture which extends circumferentially around a spindle and defines the actuation travel path of the handle,
    the interlock aperture including an insertion aperture and an elongate actuation aperture having a longitudinal axis and a width transverse to the longitudinal axis,
    wherein the insertion aperture is wider than the transverse width of the actuation aperture.

8. The powder dispensing apparatus of claim 6, further comprising two interlock apertures on diametrically opposing sides of the spindle housing.

9. The powder dispensing apparatus of claim 1, comprising the handle.

10. The powder dispensing apparatus of claim 9, comprising a single handle only.

11. The powder dispensing apparatus of claim 9, wherein the handle comprises a mounting portion at a first end thereof.

12. The powder dispensing apparatus of claim 11, wherein the mounting portion comprises an expanded section for inserting into and drivably engaging with a spindle.

13. The powder dispensing apparatus of claim 12, wherein the mounting portion comprises a reduced section adjacent to the expanded section with a radially extending shoulder therebetween.

14. The powder dispensing apparatus of claim 11, further comprising a first mounting portion and a second mounting portion distributed along a length of the handle and for engaging with the respective first and second interlock apertures.

15. The powder dispensing apparatus of claim 14, wherein the expanded section is a first expanded section, the reduced section is a first reduced section and the radially extending shoulder is a first shoulder of the first mounting portion; and,
    the second mounting portion comprises a second expanded section and a second reduced section separated by a second radially extending shoulder.

16. The powder dispensing apparatus of claim 15, wherein the second expanded section is smaller in diameter than the first expanded section.

17. The powder dispensing apparatus of claim 1, further comprising the receptacle.

18. A kit of parts comprising the powder dispensing apparatus of claim 1 and further comprising: a plurality of the receptacles, each receptacle having a different size and/or a plurality of dispensing chambers, wherein each dispensing chamber has a different predetermined volume.

19. A method of dispensing a powder from a powder dispensing apparatus comprising:
    a powder source;
    a dispensing chamber attached to the powder source;
    an inlet valve movable between a closed state and an open state to control ingress of powder into the dispensing chamber from the powder source;
    an outlet valve movable between a closed state and an open state to control egress of powder from the dispensing chamber to a receptacle; and wherein the inlet valve and outlet valve are individually actuated between the closed state and open state by a common removable handle, the inlet valve and outlet valve each comprise an interlock for receiving and engaging the handle, the interlock is configured to receive and release the handle when the respective valve is in the closed state and engage the handle so as to prevent removal of the handle when the respective valve is in the open state;
    the method comprising the steps of:
    a) mounting the handle to the inlet valve, opening the inlet valve with the handle to allow ingress of powder into the dispensing chamber, closing the inlet valve with the handle and removing the handle;
    b) mounting the handle to the outlet valve and opening the outlet valve to allow egress of powder from the dispensing chamber into the receptacle; and,
    c) removing the receptacle.

20. The method of claim 19, further comprising: closing the outlet valve and removing the handle from the outlet valve.

* * * * *